(12) United States Patent
Baker et al.

(10) Patent No.: US 6,183,628 B1
(45) Date of Patent: Feb. 6, 2001

(54) PROCESS, INCLUDING PSA AND MEMBRANE SEPARATION, FOR SEPARATING HYDROGEN FROM HYDROCARBONS

(75) Inventors: Richard W. Baker, Palo Alto; Kaaeid A. Lokhandwala, Union City; Zhenjie He, Fremont; Ingo Pinnau, Palo Alto, all of CA (US)

(73) Assignee: Membrane Technology and Research, Inc., Menlo Park, CA (US)

( * ) Notice: Under 35 U.S.C. 154(b), the term of this patent shall be extended for 0 days.

(21) Appl. No.: 09/316,498

(22) Filed: May 21, 1999

Related U.S. Application Data

(63) Continuation-in-part of application No. 09/273,207, filed on Mar. 19, 1999.

(51) Int. Cl.[7] .................................................. C10G 9/00
(52) U.S. Cl. ..................... 208/100; 208/100; 208/102; 208/103
(58) Field of Search .................... 208/100, 102, 208/308

(56) References Cited

U.S. PATENT DOCUMENTS

| | | |
|---|---|---|
| 4,229,188 | 10/1980 | Intille .................................... 55/165 |
| 4,238,204 | 12/1980 | Perry ....................................... 55/16 |
| 4,362,613 | 12/1982 | MacLean ............................ 208/108 |
| 4,367,135 | 1/1983 | Posey, Jr. ............................ 208/108 |
| 4,370,150 | 1/1983 | Fenstermaker .......................... 55/16 |
| 4,398,926 | 8/1983 | Doshi ..................................... 55/16 |
| 4,548,619 | 10/1985 | Steacy ................................... 55/16 |
| 4,654,063 | 3/1987 | Auvil et al. ............................. 62/18 |
| 4,690,695 | 9/1987 | Doshi ..................................... 55/16 |
| 4,701,187 | 10/1987 | Choe et al. ............................. 55/16 |
| 4,783,203 | 11/1988 | Doshi ..................................... 55/16 |
| 4,836,833 | 6/1989 | Nicholas et al. ........................ 55/16 |
| 4,857,078 | 8/1989 | Watler ..................................... 55/16 |
| 4,892,564 | 1/1990 | Cooley ................................... 55/16 |
| 5,053,067 | 10/1991 | Chretien ................................. 62/24 |
| 5,082,481 * | 1/1992 | Barchas et al. ......................... 55/16 |
| 5,082,551 * | 1/1992 | Reynolds et al. .................... 208/100 |
| 5,089,033 | 2/1992 | Wijmans ................................. 55/16 |
| 5,157,200 | 10/1992 | Mikkinen et al. .................... 585/803 |
| 5,199,962 | 4/1993 | Wijmans ................................. 55/16 |
| 5,205,843 | 4/1993 | Kaschemekat et al. ................. 55/16 |
| 5,278,344 | 1/1994 | Gosling et al. ...................... 585/322 |
| 5,332,424 | 7/1994 | Rao et al. ............................... 95/47 |
| 5,332,492 | 7/1994 | Maurer et al. ....................... 208/340 |
| 5,354,547 | 10/1994 | Rao et al. ............................. 423/650 |
| 5,374,300 | 12/1994 | Kaschemekat et al. ................ 95/39 |
| 5,435,836 | 7/1995 | Anand et al. ............................ 95/49 |
| 5,447,559 | 9/1995 | Rao et al. ................................ 96/4 |
| 5,507,856 | 4/1996 | Rao et al. .............................. 95/50 |
| 5,634,354 | 6/1997 | Howard et al. ........................ 62/624 |
| 5,669,958 | 9/1997 | Baker et al. ............................ 95/50 |
| 5,689,032 | 11/1997 | Krause et al. ....................... 585/802 |
| 5,753,010 | 5/1998 | Sircar et al. ........................... 95/454 |
| 5,785,739 * | 7/1998 | Baker ................................... 585/818 |

OTHER PUBLICATIONS

W.A. Bollinger et al., "Prism™Separators Optimize Hydrocracker Hydrogen," presented at AIChE 1983 Summer National Meeting, Session No, 66, Aug. 29, 1983.

W.A. Bollinger et al., "Optimizing Hydrocracker Hydrogen," Hydrocarbon Processing, Feb. 1995.

J.M. Abrardo et al., "Hydrogen Technologies to Meet Refiners'Future Needs," Hydrocarbon Processing, Feb. 1995.

H. Yamashiro et al., "Hydrogen Purification with Cellulose Acetate Membranes," presented at Europe–Japan Congress on Membranes and Membrane Processes, Jun. 18–21, 1984.

H. Yamashiro et al., "Plant Uses Membrane Separation," Hydrocarbon Processing, Feb. 1985.

"Polymeric Gas Separation Membranes," Paul and Yampolski (eds.).

* cited by examiner

*Primary Examiner*—Helane Myers
(74) *Attorney, Agent, or Firm*—J. Farrant

(57) ABSTRACT

An improved process for separating hydrogen from hydrocarbons. The process includes a pressure swing adsorption step, a compression/cooling step and a membrane separation step. The membrane step relies on achieving a methane/hydrogen selectivity of at least about 2.5 under the conditions of the process.

15 Claims, 7 Drawing Sheets

PROCESS, INCLUDING PSA AND MEMBRANE SEPARATION, FOR SEPARATING HYDROGEN FROM HYDROCARBONS

This application is a continuation-in-part of application Ser. No. 09/273,207 filed Mar. 19, 1999, which is incorporated herein by reference in its entirety.

This invention was made in part with Government support under SBIR award number DE-FG03-98ER82618 awarded by the Department of Energy. The Government has certain rights in this invention.

FIELD OF THE INVENTION

The invention relates to oil refinery and petrochemical operations, and specifically to the treatment of off-gas streams containing hydrogen and mixed hydrocarbons from such operations by pressure swing adsorption and membrane gas separation.

BACKGROUND OF THE INVENTION

Besides providing the octane level needed for gasoline products, the catalytic reformer is the principal hydrogen producer within a refinery. An important aspect of reformer operation is to generate as much hydrogen as possible, consistent with other requirements, of a quality suitable for use in the hydrogen-consuming units, particularly hydrocrackers and hydrotreaters.

The overhead vapor from the reformer reactors is typically split into at least two portions, one for recycle in the reactor loop, the other that forms a purge from the loop and that is the source of the net hydrogen product. This reactor purge stream is often sent to pressure swing adsorption (PSA) for upgrading to a high purity hydrogen product, typically containing 99% or more hydrogen. The hydrocarbon tail gas stream created when the PSA beds are regenerated is frequently treated as a waste gas stream and sent in its entirety to the plant fuel header.

Use of pressure swing adsorption (PSA) for this upgrading step is taught, for example, in U.S. Pat. No. 5,332,492, in which PSA tail gas is returned to the contactor section of the phase-separation steps, and U.S. Pat. No. 5,278,344, in which PSA is used to purify the net hydrogen stream after catalytic reforming and in front of a hydrodealkylation step.

It is also possible to use PSA to treat other diverse streams containing mixtures of hydrogen and hydrocarbons in refineries and elsewhere. Representative examples of such hydrogen-containing streams include overhead streams from fractionation columns used downstream of catalytic crackers, hydrocrackers and the like, overhead streams from cryogenic and other condensation units, overhead streams from absorbers, effluent streams from steam reformers, and refinery and petrochemical waste streams in general.

It is also known to use membrane separation for removing hydrogen from hydrocarbons in gas streams from various sources. U.S. Pat. Nos. 4,362,613, and 4,367,135, both to Monsanto, describe processes for treating the vapor from phase separators in a hydrocracking plant by passing the vapor across a membrane that is selectively permeable to hydrogen. The process yields a hydrogen-enriched permeate that can be recompressed and recirculated to the reactor. U.S. Pat. No. 4,548,619, to UOP, shows membrane treatment of the overhead gas from an absorber treating effluent from benzene production. The membrane again permeates the hydrogen selectively and produces a hydrogen-enriched gas product that is withdrawn from the process. U.S. Pat. No. 5,053,067, to L'Air Liquide, discloses removal of part of the hydrogen from a refinery off-gas to change the dewpoint of the gas to facilitate downstream treatment. U.S. Pat. No. 5,082,481, to Lummus Crest, describes removal of carbon dioxide, hydrogen and water vapor from cracking effluent, the hydrogen separation being accomplished by a hydrogen-selective membrane. U.S. Pat. No. 5,157,200, to Institut Francais du Petrole, shows treatment of light ends containing hydrogen and hydrocarbons, including using a hydrogen-selective membrane to separate hydrogen from other components. U.S. Pat. No. 5,689,032, to Krause/Pasadyn, discusses a method for separating hydrogen and hydrocarbons from refinery off-gases, including multiple low-temperature condensation steps and a membrane separation step for hydrogen removal.

The use of certain polymeric membranes to treat off-gas streams in refineries is also described in the following papers: "Prism™ Separators Optimize Hydrocracker Hydrogen", by W. A. Bollinger et al., presented at the AIChE 1983 Summer National Meeting, August 1983; and "Optimizing Hydrocracker Hydrogen" by W. A. Bollinger et al., in Chemical Engineering Progress, May 1984. The use of membranes in refinery separations is also mentioned in "Hydrogen Technologies to Meet Refiners' Future Needs", by J. M. Abrardo et al. in Hydrocarbon Processing, February 1995. This paper points out the disadvantage of membranes, namely that they permeate the hydrogen, thereby delivering it at low pressure, and that they are susceptible to damage by hydrogen sulfide and heavy hydrocarbons. Papers that specifically concern treatment of reformer off-gases are "Hydrogen Purification with Cellulose Acetate Membranes", by H. Yamashiro et al., presented at the Europe-Japan Congress on Membranes and Membrane Processes, June 1984; and "Plant Uses Membrane Separation", by H. Yamashiro et al., in Hydrocarbon Processing, February 1985. In these papers, a system and process using membranes to treat the overhead gas stream from the absorber/recontactor section of the plant are described. All of these papers describe system designs using cellulose acetate or similar membranes that permeate hydrogen and reject hydrocarbons.

A chapter in "Polymeric Gas Separation Membranes", D. R. Paul et al. (Eds.) entitled "Commercial and Practical Aspects of Gas Separation Membranes", by Jay Henis describes various hydrogen separations that can be performed with hydrogen-selective membranes.

Literature from Membrane Associates Ltd., of Reading, England, shows and describes a design for pooling and downstream treating various refinery off-gases, including passing of the membrane permeate stream to subsequent treatment for LPG recovery.

Other references that describe membrane-based separation of hydrogen from gas streams in a general way include U.S. Pat. Nos. 4,654,063 and 4,836,833, to Air Products and Chemicals, and U.S. Pat. No. 4,892,564, to Cooley. U.S. Pat. No. 4,857,078, to Watler, mentions that, in natural gas liquids recovery, streams that are enriched in hydrogen can be produced as retentate by a rubbery membrane.

The use of rubbery polymeric membranes operated at low temperature to separate methane from nitrogen is taught in U.S. Pat. No. 5,669,958.

It has also been recognized that condensation and membrane separation may be combined, as is shown in U.S. Pat. Nos. 5,089,033; 5,199,962; 5,205,843 and 5,374,300.

Numerous patents describe combinations of membrane separation with PSA. Representative examples include U.S.

Pat. Nos. 4,229,188; 4,238,204; 4,398,926; 4,690,695; 4,701,187; and 4,783,203. U.S. Pat. No. 5,332,424, to Air Products and Chemicals, describes fractionation of a gas stream containing hydrocarbons and hydrogen using an "adsorbent membrane". The membrane is made of carbon, and selectively adsorbs hydrocarbons onto the carbon surface, allowing separation between various hydrocarbon fractions to be made. Hydrogen tends to be retained in the membrane residue stream. Optionally, the membrane separation step is followed by PSA treatment. Other Air Products patents that show application of carbon adsorbent membranes to hydrogen/hydrocarbon separations include U.S. Pat. Nos. 5,354,547; 5,447,559; and 5,507,856, which all show combinations of carbon adsorbent membranes followed by PSA. U.S. Pat. No. 5,634,354 discloses removal of hydrogen from hydrogen/olefin streams. In this case, the membrane used to perform the separation is either a polymeric membrane selective for hydrogen over hydrocarbons or a carbon adsorbent membrane selective for hydrocarbons over hydrogen.

U.S. Pat. No. 5,435,836, concerns treatment of mixtures of hydrogen, carbon dioxide, carbon monoxide and methane from steam reformers. The gas mixture from the steam reformer is treated by PSA to recover a high purity hydrogen stream. The waste gas from the PSA unit is then treated by membrane separation using a carbon adsorbent membrane. The hydrogen-rich residue is returned to the PSA unit and the permeate gas from the membrane unit can optionally be used as fuel for the steam reformer. U.S. Pat. No. 5,753,010 discloses a process similar to that of U.S. Pat. No. 5,435,836, but in which the tail gas from the PSA unit is split into two fractions of unlike composition, which are treated separately in two discrete membrane steps.

Patent application Ser. No. 09/083,784, copending with the present application, describes treatment of off-gases from fluid catalytic cracking absorbers using hydrocarbon-selective membranes.

Patent application Ser. No. 09/083,660, copending with the present application, describes treatment of overhead gases in hydrocarbon conversion reactors of any type by passing gases in the reactor recycle loop across hydrocarbon-selective membranes. Patent application Ser. No. 09/083,872, copending with the present application, describes such a process applied specifically to hydrotreaters and hydrocrackers.

Patent application Ser. No. 09/083,560, now U.S. Pat. No. 6,011,192, issued Jan. 4, 2000, describes a process in which a rubbery polymeric membrane is used to condition a gas stream to remove heavy hydrocarbons before PSA treatment.

Patent application Ser. No. 09/083,653, copending with the present application, describes the use of hydrogen-rejecting membranes to directly treat overhead gases from the phase separators of catalytic reformers.

SUMMARY OF THE INVENTION

The invention is an improved process for treating effluent streams from refinery, petrochemical and other operations. The invention separates a stream containing at least hydrogen, methane and a $C_{3+}$ hydrocarbon into three streams: a hydrogen-enriched stream suitable for use as a source of hydrogen, a liquid $C_{3+}$ hydrocarbon stream suitable for use as a source of LPG, and a methane-rich stream suitable for use as fuel gas.

In its most simple form, the invention includes three unit operations or steps: a pressure swing adsorption (PSA) step to separate a high-purity hydrogen stream from the effluent stream; a cooling and phase separation step to liquefy and remove a portion of the $C_{3+}$ hydrocarbons present in the tail gas from the PSA beds after regeneration; and a membrane separation step to separate the remaining hydrocarbons from hydrogen.

In a basic embodiment, these steps take the following form:

(a) passing a stream comprising hydrogen, methane and a $C_{3+}$ hydrocarbon through a pressure swing adsorption unit, thereby producing a hydrogen-enriched product stream and a tail gas stream;

(b) cooling the tail gas stream, thereby producing a condensed $C_{3+}$ hydrocarbon stream and an uncondensed stream;

(c) passing the uncondensed stream across the feed side of a membrane separation unit containing a rubbery polymeric membrane having a feed side and a permeate side, and being selectively permeable to methane over hydrogen, under conditions sufficient that the membrane exhibits a methane/hydrogen selectivity of at least about 2.5;

(d) withdrawing from the permeate side a permeate stream enriched in methane and $C_{3+}$ hydrocarbon compared with the uncondensed stream;

(e) withdrawing from the feed side a residue stream enriched in hydrogen compared with the uncondensed stream.

The process relies on obtaining a methane/hydrogen selectivity of at least about 2.5, more preferably at least about 3, and most preferably at least about 4, in the membrane separation step. This selectivity, which has hitherto been unknown in any membrane material, is achieved in the preferred case by using a polysiloxane membrane, particularly a silicone rubber membrane. The ability of such a membrane to produce such a comparatively high methane/hydrogen selectivity at low temperature and in the presence of one or more $C_{3+}$ hydrocarbons is unexpected and very advantageous in terms of obtaining three useful product streams from the process. Furthermore, under these conditions the membrane exhibits extremely high selectivity for other hydrocarbons over hydrogen, such as 10 or more for ethane/hydrogen and 30 or more for propane/hydrogen.

The tail gas from regeneration of the PSA beds is typically at comparatively low pressure, for example about 50 psia. Production of a liquid $C_{3+}$ hydrocarbons stream in step (b) is facilitated, therefore, by compressing the tail gas to a few hundred psi in addition to cooling it. The compression/cooling step also produces a membrane feed stream containing an appropriate amount of $C_{3+}$ hydrocarbon and at an appropriate temperature to yield a methane/hydrogen selectivity of at least about 2.5 in the membrane separation step.

Preferably, the invention includes an additional step of recirculating at least a portion of the hydrogen-enriched membrane residue stream to the pressure swing adsorption unit, thereby increasing the amount of high-purity hydrogen produced by the process.

Optionally, at least a portion of the membrane permeate stream is recirculated to the compression/cooling step.

The invention has an important advantage over other polymeric membrane separation processes that have been used in the industry in the past: all hydrocarbons, including methane, permeate the membrane preferentially, leaving a residue stream on the feed side that is concentrated in the slower-permeating hydrogen. The use of hydrocarbon-selective, hydrogen-rejecting polymeric membranes means that the hydrogen-enriched stream is retained on the feed side of the membrane. In other words, the hydrogen-enriched stream withdrawn from the membrane separation unit remains at pressure, which is desirable for recycle to the adsorption unit, as well as for facilitating delivery to other destinations in embodiments in which the residue stream is not recycled in the process. In contrast, hydrogen-selective membranes deliver a hydrogen-enriched stream at the comparatively low pressure of the permeate side, and this stream must almost always be recompressed for further treatment or use.

The use of polymeric materials for the membranes renders the membranes easy and inexpensive to prepare, and to house in modules, by conventional industrial techniques, unlike other types of hydrogen-rejecting membranes, such as finely microporous inorganic membranes, including adsorbent carbon membranes, pyrolysed carbon membranes and ceramic membranes, which are difficult and costly to fabricate in industrially useful quantities.

The invention has a number of advantages, including but not limited to:
  increased hydrogen production compared with prior art techniques
  production of a discrete LPG stream
  ability to debottleneck plants where fuel gas production is at maximum.

Optionally, the hydrogen-rich stream from the membrane separation operation may be sent to a second membrane separation step to provide additional separation between the remaining light hydrocarbons and hydrogen. In this case, it is preferred to recirculate the permeate from the first membrane separation step to the compression/cooling step, to recirculate the hydrogen-rich residue from the second membrane separation step to the PSA step and to withdraw the methane-rich permeate from the second membrane separation step for use as fuel gas or to send to any other desired destination.

The preferred membranes used in the present invention permeate all of the hydrocarbons, hydrogen sulfide and water vapor preferentially over hydrogen, and are capable of withstanding exposure to these materials even in comparatively high concentrations. This contrasts with cellulose acetate and like membranes, which must be protected from exposure to heavy hydrocarbons and water. If liquid water or $C_{3+}$ hydrocarbons condense on the surface of such membranes, which can happen if the temperature within the membrane modules is lower than the upstream temperature and/or as the removal of hydrogen through the membrane increases the concentration of other components on the feed side, the membranes can suffer catastrophic failure. On the other hand, the membranes used in the invention preferentially and rapidly pass these components, so they do not build up on the feed side. Thus, the membranes can handle a wide diversity of stream types. This is a differentiating and important advantage over processes that have previously been available.

Most significantly, the invention provides membrane processes that can separate methane from hydrogen with a practical, industrially useful selectivity, and retain the hydrogen at high pressure.

It is to be understood that the above summary and the following detailed description are intended to explain and illustrate the invention without restricting its scope.

DETAILED DESCRIPTION OF THE INVENTION

The terms gas and vapor are used interchangeably herein.

The term $C_{2+}$ hydrocarbon means a hydrocarbon having at least two carbon atoms; the term $C_{3+}$ hydrocarbon means a hydrocarbon having at least three carbon atoms; and so on.

The term $C_{2-}$ hydrocarbon means a hydrocarbon having no more than two carbon atoms; the term $C_{3-}$ hydrocarbon means a hydrocarbon having no more than three carbon atoms; and so on.

The term light hydrocarbon means a $C_1$ or $C_2$ hydrocarbon.

The term heavier hydrocarbons means $C_{3+}$ hydrocarbons.

Percentages herein are by volume unless otherwise stated.

The invention is an improved process for treating effluent streams from refinery, petrochemical and other operations. The invention separates a stream containing at least hydrogen, methane and a $C_{3+}$ hydrocarbon into three streams: a hydrogen-enriched stream suitable for use as a source of hydrogen, a liquid $C_{3+}$ hydrocarbon stream suitable for use as a source of LPG, and a methane-rich stream suitable for use as fuel gas.

The process can be applied to any gas stream containing such a mix of components. Streams that may be treated by the process of the invention include, but are not limited to, streams from unit operations in refineries, such as catalytic reforming, hydrocracking, catalytic cracking and isomerization; and streams from petrochemical and other chemical manufacturing operations, such as dealkylation, hydrogenation, steam cracking and ammonia production. In a basic aspect, the invention includes three unit operations or steps: a pressure swing adsorption (PSA) step to separate a high-purity hydrogen stream from the effluent stream; a cooling and phase separation step to liquefy and remove a portion of the $C_{3+}$ hydrocarbons present in the tail gas from the PSA beds after regeneration; and a membrane separation step to separate the remaining hydrocarbons from hydrogen. The membrane separation step uses a rubbery polymeric membrane, preferably polysiloxane, and is carried out under conditions that provide a methane/hydrogen selectivity of at least about 2.5, more preferably at least about 3, and most preferably at least about 4.

Figure 1:
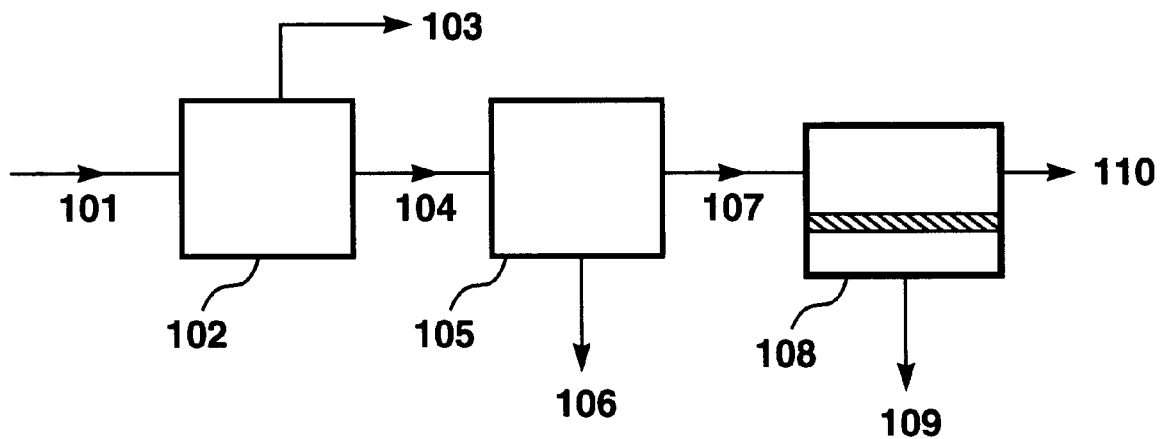
FIG. 1 is a schematic drawing showing a basic embodiment of the invention.

The invention in its basic aspect is shown schematically in FIG. 1. It will be appreciated by those of skill in the art that this and the other figures described below are very simple schematic diagrams, intended to make clear the key aspects of the invention, and that an actual process train will usually include many additional components of a standard type, such as compressors, heaters, chillers, condensers, pumps, blowers, other types of separation and/or fractionation equipment, valves, switches, controllers, pressure-, temperature-, level- and flow-measuring devices and the like. Referring to this figure, feed stream 101, containing at least methane, hydrogen and a $C_{3+}$ hydrocarbon, passes to PSA treatment step 102. The goal of this step is to provide a supply of hydrogen, typically, but not necessarily, of better than 99% purity, for reuse in the process from which stream 101 originates, or elsewhere, such as in hydrotreating or hydrocracking.

PSA systems usually comprise a series of beds of a zeolite or similar material that will selectively sorb one or more components of the gas mixture. The beds are connected in such a way that each bed can be switched periodically from adsorption mode to regeneration mode. As one bed or set of beds is taken off-line for regeneration, another bed or set of beds is switched in so that gas can be processed continuously. In the sorption mode, which is typically carried out at elevated pressure, typically above 150 psia, such as 200 psia, 300 psia, 500 psia or above, hydrocarbons are adsorbed onto the active beds. In the present invention, the adsorption step is carried out preferably at a pressure no higher than about 750 psia, and more preferably in the range 50–500 psia. The gas exiting the bed, stream 103, typically has a very high hydrogen content, such as 99 vol % hydrogen or higher.

When the adsorbing beds have been charged to the desired level, they are switched into desorption/regeneration mode. The desorption/regeneration step can be carried out by any convenient techniques known in the art. Such techniques include, but are not limited to, passing a displacement gas cocurrently through the bed to sweep out unadsorbed gas from the void spaces, cocurrent depressurization of the bed to position the mass transfer front appropriately, countercurrent depressurization to remove previously adsorbed gas, and countercurrent purging to complete regeneration of the bed for reuse.

Depressurization of the bed during these steps may take place by multiple reductions in pressure, as is known in the art, and may reduce the pressure to atmospheric pressure (15 psia) or below. Removal of void space gas and positioning of the mass transfer front is preferably carried out, however, at a pressure in the range 50–250 psia, and countercurrent desorption is preferably carried out at a pressure no lower than 15 psia, more preferably in the range 15–75 psia, yet more preferably no lower than about 30 psia and most preferably no lower than about 50 psia.

By way of non-limiting example, a typical bed cycle may be: (i) adsorption at 500 psia; (ii) depressurization to 200 psia under cocurrent flow conditions; (iii) depressurization to 50 psia under countercurrent flow conditions; (iv) purging at 50 psia; (v) repressurization.

The hydrogen product stream is withdrawn from the process as stream 103. The hydrocarbon gases that are removed during the desorption/regeneration steps are shown generally in FIG. 1 as stream 104. In practice, several streams of different compositions will be produced during the individual parts of the regeneration cycle. It is within the scope of the invention to treat only one of these streams, or some other portion of the total, in the remaining steps 105 and 108, but is preferred to treat all of the PSA off gas, or tail gas, as shown in FIG. 1.

In the aggregate, tail gas stream 104 has a typical composition of about 40%, 50% or 60% hydrogen and 60%, 50% or 40% mixed $C_1$–$C_6$ hydrocarbons. This stream is passed to compression/cooling step 105. This step has two functions: one, to condense part of the $C_{3+}$ hydrocarbons content of stream 104 to produce an LPG or liquefied light hydrocarbon product, and two, to facilitate the subsequent membrane separation step and downstream recycle or treatment. Any type of compressor may be used to compress stream 104, and the desired pressure may be reached in one or multiple stages. Preferably, the stream is raised to a pressure in the range 150–750 psia, and most preferably in the range about 300–400 psia.

It is desirable to avoid cooling to very low temperatures, since reaching these adds to the cost and complexity of the process. By very low temperatures, we mean temperatures below about –100° C. The temperature at which step 105 is operated should be above –100° C., and most preferably above about –40° C. Temperatures down to about the bottom of the most preferred range should be possible to reach by single-stage refrigeration, for example using propylene as the cooling refrigerant.

The degree of cooling to which the gas is subjected also depends to some extent on the gas composition. The invention relies on obtaining a methane/hydrogen selectivity of at least about 2.5 in the membrane separation step. Such a selectivity is currently unknown from any membrane material at temperatures above 0° C. Unexpectedly, however, as discussed in more detail below with regard to the membrane separation step, we have found that a methane/hydrogen selectivity of 2.5, 3, or even 4 or more can be obtained from a silicone rubber membrane exposed to a stream containing hydrogen, methane and a $C_{3+}$ hydrocarbon at sub-zero temperatures. Thus, the preferred operating range for the compression/cooling step is between 0° C. and –40° C. The temperature can be reached in any manner, including, but not limited to, simple air aftercooling of the compressor outlet gases, heat exchange against other streams, such as the streams entering or leaving the membrane unit, chilling by external refrigerants, and any combinations of these. Such methods are familiar to those of skill in the art. The compression/cooling step results in condensation of a liquid hydrocarbon fraction, stream 106, which is withdrawn from the process, and which may be sent to any desired destination.

Gas stream 107 leaves the compression/cooling step and passes to membrane separation step 108. The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{3+}$ organic molecules. For rubbery or elastomeric polymers, the difference in size is much less critical, because the polymer chains can be flexed, and sorption effects generally dominate the permeability. Elastomeric materials, therefore, tend to permeate larger, condensable molecules faster than small, low-boiling molecules. Thus, most rubbery materials are selective in favor of all $C_{3+}$ hydrocarbons over hydrogen. Examples of polymers that can be used to make such elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, and thermoplastic polyolefin elastomers. For the smallest, least condensable hydrocarbons, methane in particular, even rubbery polymers tend to be selective in favor of hydrogen, because of the relative ease with which the hydrogen molecule can diffuse through most materials. For example, neoprene rubber has a selectivity for hydrogen over methane of about 4, natural rubber a selectivity for hydrogen over methane of about 1.6, and Kraton, a commercial polystyrene-butadiene copolymer, has a selectivity for hydrogen over methane of about 2. Therefore, although any of the rubbery membrane materials mentioned above are useful for providing separation of $C_{2+}$ hydrocarbons from hydrogen, even most rubbery materials are unsuitable for the type of methane/hydrogen separation required in the present invention. To applicants' knowledge, among the polymeric membranes that perform gas separation based on the solution/diffusion mechanism, silicone rubber, specifically polydimethylsiloxane (PDMS) and closely related polymers are the only materials that are selective in favor of methane over hydrogen, and thus are potentially useful within the scope of the invention. Other materials that we expect may be found to be methane/hydrogen selective include other polysiloxanes, such as other alkyl-substituted siloxanes, copolymers of PDMS or other alkyl-substituted siloxane with other materials, and the like. For example, U.S. Pat. No. 4,370,150 cites data for silicone-polycarbonate copolymer membranes that suggest a pure gas selectivity of about 1.3 for methane over hydrogen, but this would, of course, depend on the exact composition of the polymer and the other components of an actual gas.

As mentioned above, the invention relies on obtaining a methane/hydrogen selectivity of at least about 2.5, more preferably at least about 3, and most preferably at least about 4 in the membrane separation step. However, such a selectivity is currently unknown from any membrane material at temperatures above 0° C. Our experiments with silicone rubber films and binary methane/hydrogen mixtures at sub-zero temperatures showed that the methane/hydrogen selectivity increases only slightly with decreasing temperature, from about 1.4 at 20° C. to about 1.9 at −20° C. Furthermore, the permeability of silicone rubber to both hydrogen and methane drops with decreasing temperature. Unexpectedly, however, in a multicomponent mixture containing hydrogen, methane and $C_{3+}$ hydrocarbons, the permeability of silicone rubber to methane was no longer found to decrease with decreasing temperature, but now to increase with decreasing temperature, a trend opposite to that observed with the binary gas mixture. In the same multicomponent mixture, however, the hydrogen permeability continues to decrease with decreasing temperature, resulting in a substantial increase in methane/hydrogen selectivity. In tests with silicone rubber films of a few hundred microns thickness, we found that a methane/hydrogen selectivity of 3, 4 or even 5 or more can be obtained when the film is exposed to a stream containing hydrogen, methane and a $C_{3+}$ hydrocarbon at sub-zero temperatures, such as −5° C. or −20° C. Using composite membranes of just a few microns thick in membrane modules, such as will be used in an actual industrial separation process, instead of thick silicone rubber films, it is necessary to go to slightly lower temperatures to achieve comparable performance. For example, a methane/hydrogen selectivity of 4 may be attained from a laboratory film at −20° C., but it may be necessary to go to −30° C. to attain that same selectivity from a module in an industrial plant. On this basis, and taking into account also the preferred operating temperatures for the upstream condensation step, the preferred operating temperature for the membrane separation step 108 is in the range 0° C. to −40° C.

For some specific gas mixture/membrane material combinations, it may be possible to obtain adequate cooling and desired condensation of $C_{3+}$ hydrocarbons in step 105 and to obtain the desired selectivity in the membrane separation step 108 even at a temperature slightly above 0° C. In this case, operation at such a temperature will obviously reduce cooling costs and will be convenient if water vapor is present in the feed stream. On the other hand, the membrane separation performance may be less than would be achieved by operating at lower temperature.

The membrane may take any convenient form known in the art. The preferred form is a composite membrane including a microporous support layer for mechanical strength and a rubbery polymeric coating layer, most preferably silicone rubber, that is responsible for the separation properties. Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since conventional polymeric materials are used for the membranes, they are relatively easy and inexpensive to prepare and to house in modules, compared with other types of membranes that might be used as hydrogen-rejecting membranes, such as finely microporous inorganic membranes, including adsorbent carbon membranes, pyrolysed carbon membranes and ceramic membranes.

To achieve a high transmembrane hydrocarbon flux, the selective layer responsible for the separation properties should be thin, preferably, but not necessarily, no more than 30 $\mu$m thick, more preferably no more than 20 $\mu$m thick, and most preferably no more than about 10 $\mu$m thick. Although composite membranes with silicone rubber selective layers of just 1 or 2 $\mu$m thick can be made, extremely thin membranes, such as less than about 5 $\mu$m thick, are not preferred, since the resulting extremely high fluxes may give rise to a permeant-depleted boundary layer at the membrane surface on the feed side, and hence to overall diminished separation performance.

A driving force for transmembrane permeation is provided by a pressure difference between the feed and permeate sides of the membrane. Most preferably, this driving force is provided simply by compression/cooling step 105, from which membrane feed stream 107 emerges at an elevated pressure, typically of a few hundred psi. The pressure on the permeate side may be atmospheric, or may be maintained at an above-atmospheric or below-atmospheric pressure convenient with respect to the destination of the permeate stream. As a general guide, a pressure ratio (feed pressure/permeate pressure) of at least about four or five is preferred.

By selectively removing the non-hydrogen components, the membrane separation step results in a membrane residue stream, 110, that is enriched in hydrogen compared with the membrane feed stream, 107. Typically, but not necessarily, stream 110 will contain more than 60% hydrogen, such as 70% hydrogen, 75% hydrogen, 80% hydrogen or more. This stream can be sent to any desired destination. For example, it may be returned to the process from which stream 101 originates, or cascaded to another process within the refinery or chemical plant. Most preferably, at least a portion of the stream is returned to the inlet side of the PSA unit for additional hydrogen recovery, as illustrated with respect to FIG. 2.

The membrane separation step also results in a permeate stream, 109, that is enriched in methane and other hydrocarbons compared with the membrane feed stream 107. This stream can be sent to any desired destination, such as directly to the plant fuel header, to further treatment, or to a saturated gas plant for splitting into separate $C_2$–$C_5$ hydrocarbon fractions. The stream may also be of suitable composition to serve as feed to a steam reformer. Most preferably, particularly if it contains a high percentage of $C_{3+}$ hydrocarbons, such as above 10% hydrocarbons, at least a portion of stream 109 is recirculated to the compression/cooling step, as illustrated below with respect to FIG. 2.

Figure 2:
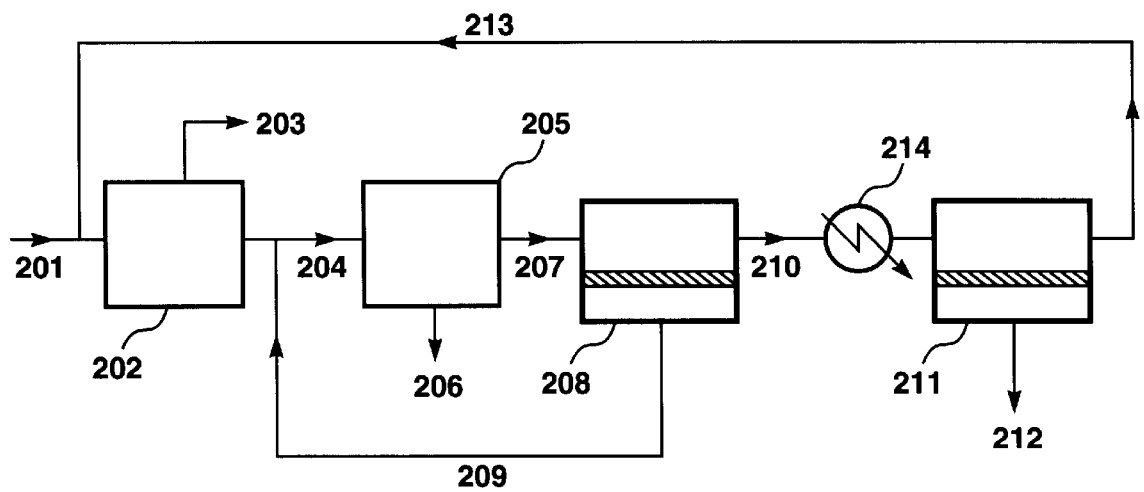
FIG. 2 is a schematic drawing showing a preferred embodiment of the invention in which an additional membrane step is used to provide selective purging of the lightest hydrocarbons.

Turning now to FIG. 2, this shows a preferred embodiment of the invention in which a second membrane separation step is used to provide more selective purging of the lightest hydrocarbons. Referring to this figure, stream 201 is passed to and treated in PSA unit 202 to form high-purity hydrogen product stream 203. Hydrocarbon tail gas stream 204, from one or more of the regeneration cycles of the PSA beds, is combined with hydrogen-depleted permeate stream 209 and introduced into compression/cooling step 205. This step is carried out under pressure/temperature conditions that give rise to liquefaction of a portion of the hydrocarbons, and that result in an uncondensed stream at a temperature and with a $C_{3+}$ hydrocarbon content that will provide a methane/hydrogen selectivity of at least about 2.5 in the subsequent membrane separation step. LPG stream 206, which is rich in $C_{3+}$ hydrocarbons, is withdrawn from the process.

The uncondensed gas, stream 207, leaves the compression/cooling step and passes to membrane separation step 208. In this case, two membrane separation steps are used, 208 and 211, and it not necessary that step 208 provide a high methane/hydrogen selectivity of 2.5 or more. Thus, although silicone rubber membranes are still most preferred, other membranes taught in parent application Ser. No. 09/273,207, such as rubbery membranes that are selective for $C_{2+}$ hydrocarbons over hydrogen and superglassy polymers, may be used in this step. Also, the step may optionally be operated at a higher temperature, such as above 0° C. This reduces the overall cooling load of the process. In addition, any water vapor present in the feed gas will permeate the membrane, be recirculated in stream 209 and be removed from the process in stream 206.

The first membrane separation step divides stream 207 into permeate stream 209, enriched in hydrocarbons and depleted in hydrogen, and residue stream 210, enriched in hydrogen and depleted in hydrocarbons. The permeate stream is recirculated to the inlet side of the compression/cooling step.

Residue stream 210 is withdrawn from membrane unit 208. In this embodiment, the process involves returning a portion of the hydrogen recovered from the PSA tail gas for additional recovery by the PSA unit, and purging a portion of the gas to control build up of methane or other light contaminants in the process loops. In this case, however, the purging is done by means of an additional membrane step, 211. This second membrane step is carried out using membranes the requirements for which are the same as those discussed above with respect to FIG. 1, namely that they be rubbery polymeric membranes capable of exhibiting a methane/hydrogen selectivity of at least about 2.5, more preferably at least about 3 and most preferably at least about 4 under the conditions of the process. Thus, for this step, polysiloxane membranes are preferred, and silicone rubber membranes are most preferred, and the preferred temperature operating range for the membrane is between 0° C. and –40° C. Because stream 210 has been dried by the first membrane separation step, sub-zero temperatures can now be used for the second membrane separation step without concern about ice formation. As the gas has already passed through the first membrane separation step, stream 210 is substantially lighter in $C_{3+}$ hydrocarbon content than stream 207. However, stream 210 is usually as much as 5° C., 10° C., 15° C. or more colder than membrane feed stream 207 as a result of Joule-Thomson cooling brought about by permeation of condensable hydrocarbons, and, as the temperature of the feed gas drops, less of the $C_{3+}$ hydrocarbon gas is required to maintain the membrane selectivity above about 2.5.

If stream 210 is not at a temperature low enough to provide the required selectivity in unit 211, it may be subjected to further optional cooling, 214, as indicated, before being introduced into unit 211. The second membrane separation step produces hydrogen-enriched residue stream 213, which is recirculated to the PSA step for additional hydrogen recovery, and methane-enriched and hydrogen-depleted permeate purge stream, 212, which is sent to fuel gas or otherwise disposed of. In this manner, the amount of unrecovered material is reduced still further compared with the embodiment of FIG. 1.

As will be appreciated by those of skill in the art, the membrane area and operating parameters of the membrane separation steps described with respect to FIGS. 1 and 2 above can be varied to focus on specific targets, such as high LPG recovery, high hydrogen recovery, or low fuel gas production. One particular benefit of the invention is that it provides control of the amount of fuel gas produced by refinery and chemical industry operations. Prior art operations that use PSA to recover hydrogen have generally sent the resulting hydrocarbon waste stream to the fuel line. The process of the invention provides the ability to reduce the gas sent to the fuel line by 50% or more, compared with the case in which PSA alone is used to treat the off gases. A useful result is that some plants that were previously bottle-necked by fuel gas production are able to increase throughput, thereby increasing product yield.

The invention is now further described by the following examples, which are intended to be illustrative of the invention, but are not intended to limit the scope or underlying principles in any way.

EXAMPLES

Example 1
Preparation of Silicone Rubber Films

Dense, isotropic films of silicone rubber (polydimethylsiloxane) [PDMS] were made from a 4-wt % solution of silicone rubber in iso-octane (Silicone Dehesive 940 A, Wacker Silicone Corp., Adrian, Mich.). The silicone rubber solution contained a crosslinker (V 24) and a platinum-based catalyst. The solution was cast on a glass plate, and the solvent was evaporated at ambient conditions for one week. The films were then dried in a vacuum oven at 80° C. for 12 hours. The thickness of the resulting films was determined with a precision micrometer. Film samples with thicknesses of 100–300 μm (±1 μm) were used for the permeation experiments.

Example 2
Permeation Properties of Silicone Rubber Films with a Binary Gas Mixture An experiment was carried out to determine the performance of silicone rubber films at different temperatures. Films were prepared as in Example 1. Samples of the films were cut into 12.6-cm² stamps, and subjected to permeation tests in a permeation test-cell apparatus. The tests were performed using the constant pressure/variable volume method, with a gas mixture containing 50% hydrogen and 50% methane. The feed pressure was 150 psig, the permeate pressure was atmospheric (0 psig), and the feed temperature was varied between −20° C. and 35° C. The compositions of the residue and permeate were determined with a gas chromatograph equipped with a thermal conductivity detector, and permeabilities were calculated. The methane/hydrogen selectivity was calculated from the ratio of the permeabilities. The stage-cut, that is, the ratio of permeate to feed flow rate, was always less than 1%.

Figure 3:
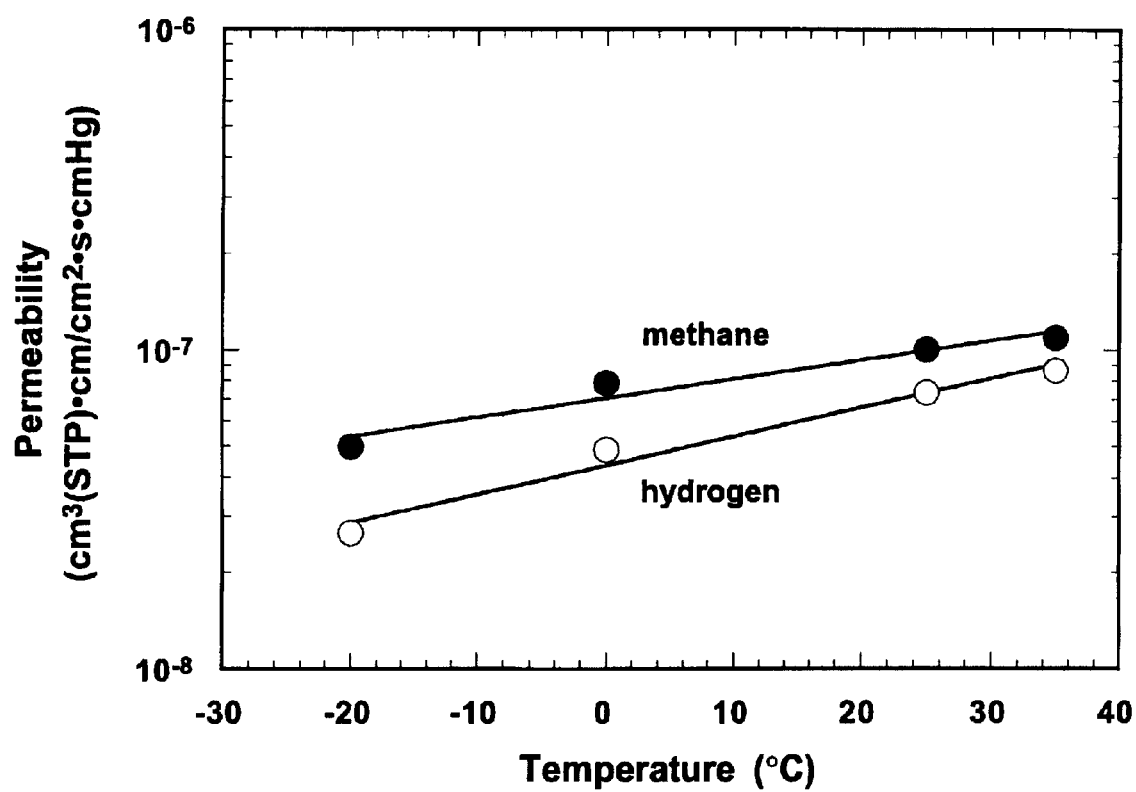
FIG. 3 is a graph showing the effect of temperature on the permeabilities of methane and hydrogen in a binary gas mixture through a silicone rubber film.
Figure 4:
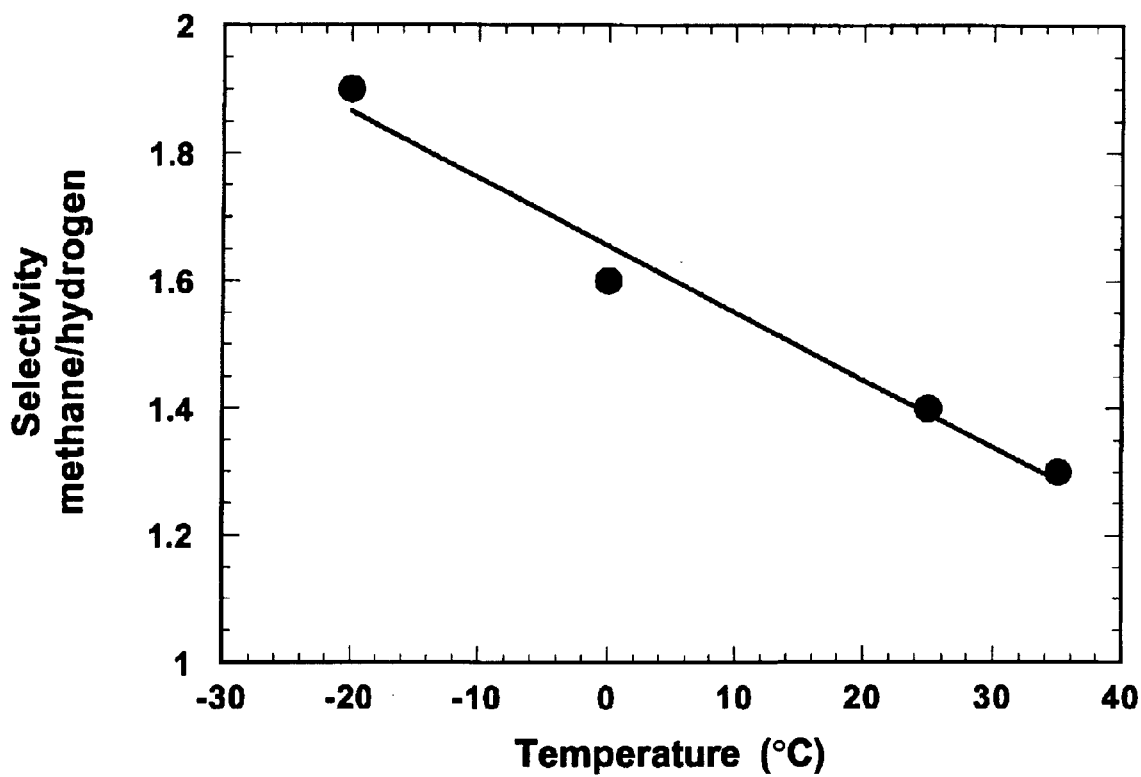
FIG. 4 is a graph showing the effect of temperature on the methane/hydrogen selectivity of a silicone rubber film measured with a binary gas mixture.

Permeability and selectivity results are shown in FIGS. 3 and 4, respectively, as a function of temperature. The methane and hydrogen permeabilities both decreased with decreasing feed temperature. The silicone rubber film was more permeable to methane than to hydrogen over the whole temperature range. Because the hydrogen permeability of silicone rubber exhibited a stronger temperature dependence than that of methane, the methane/hydrogen selectivity increased slightly from about 1.3 at 35° C. to about 1.9 at −20° C., as shown in FIG. 4.

Example 3
Permeation Properties of Silicone Rubber Films with Pure Gases

Figure 5:
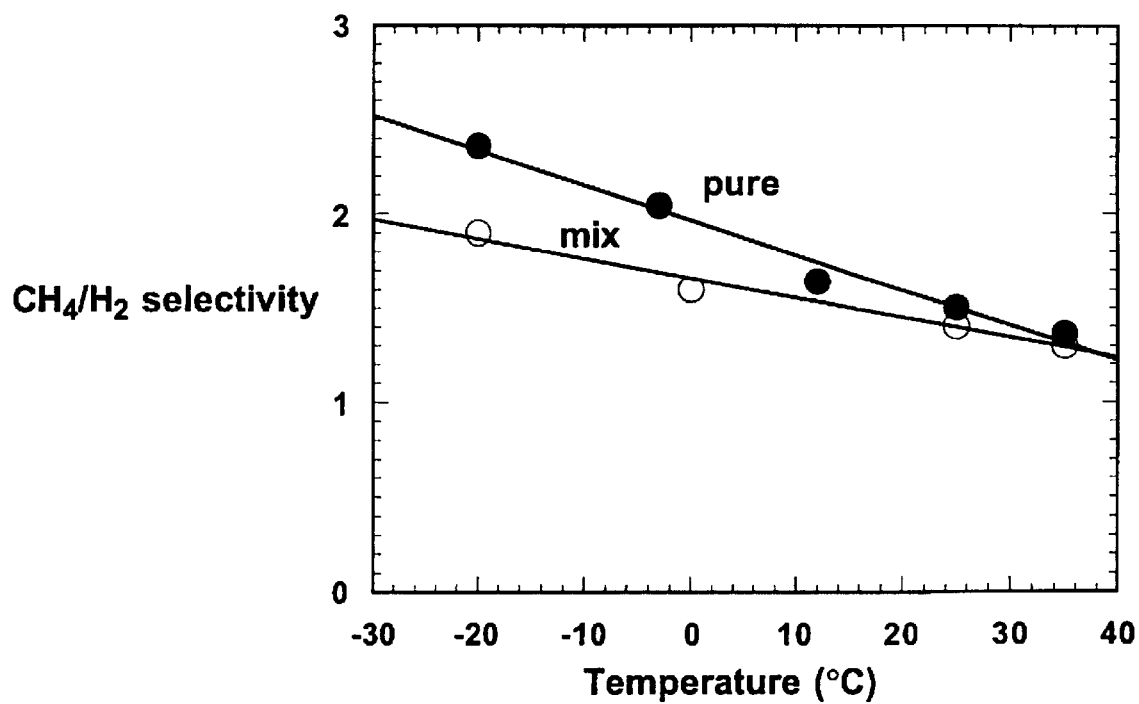
FIG. 5 is a graph comparing the effect of temperature on the methane/hydrogen selectivity of a silicone rubber film as measured with pure gases and with a binary gas mixture.

The experiment of Example 2 was repeated with pure hydrogen and pure methane. All experimental conditions were as in Example 2. The pure gas fluxes of the films were measured, and the methane/hydrogen selectivity was calculated. FIG. 5 compares the calculated pure gas methane/hydrogen selectivity to the mixed-gas methane/hydrogen selectivity obtained in Example 2.

Example 4
Permeation Properties of Silicone Rubber Films with a Multicomponent Gas Mixture The experiment of Example 2 was repeated with a gas mixture containing 50 vol % hydrogen, 19 vol % methane, 19 vol % ethane, 10 vol % propane, and 2 vol % n-butane. All experimental conditions were as in Example 2. The compositions of the residue and permeate were determined with a gas chromatograph equipped with a thermal conductivity detector, and permeabilities were calculated. The hydrocarbon/hydrogen selectivities were calculated from the ratios of the permeabilities.

Figure 6:
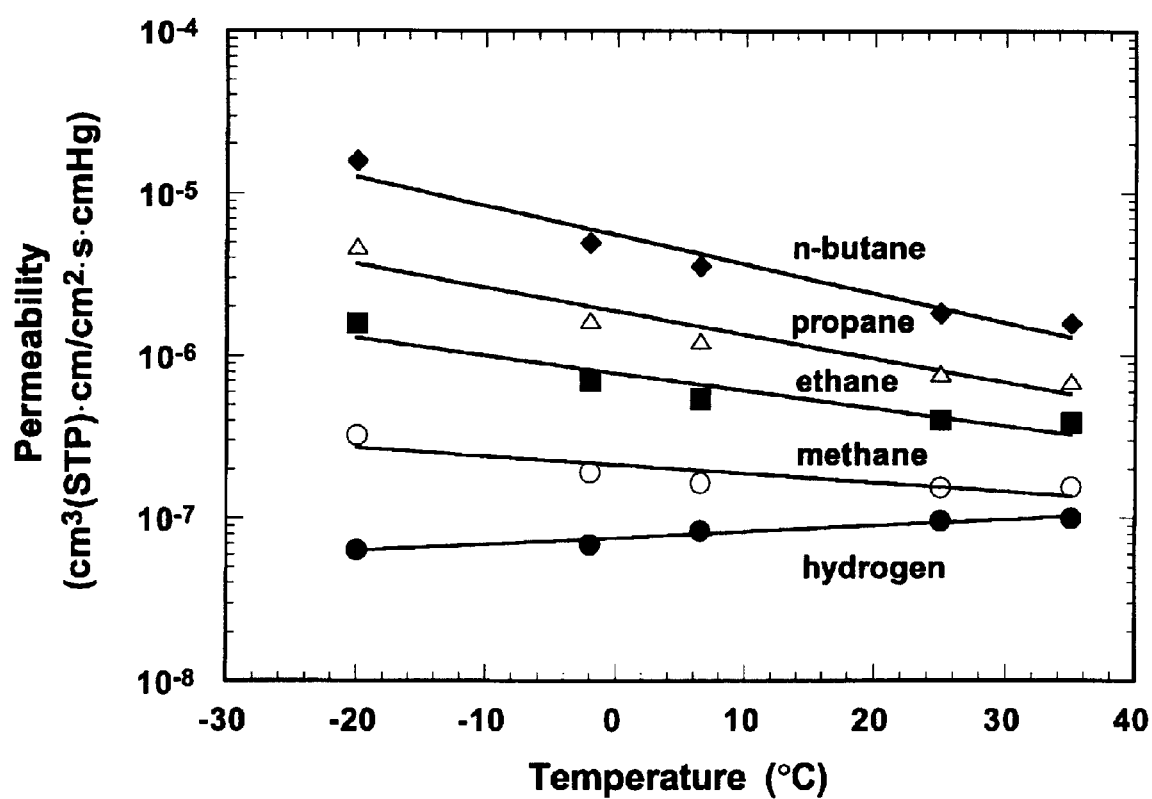
FIG. 6 is a graph showing the effect of temperature on the permeabilities of hydrogen, methane, ethane, propane and n-butane in a multicomponent gas mixture through a silicone rubber film.
Figure 7:
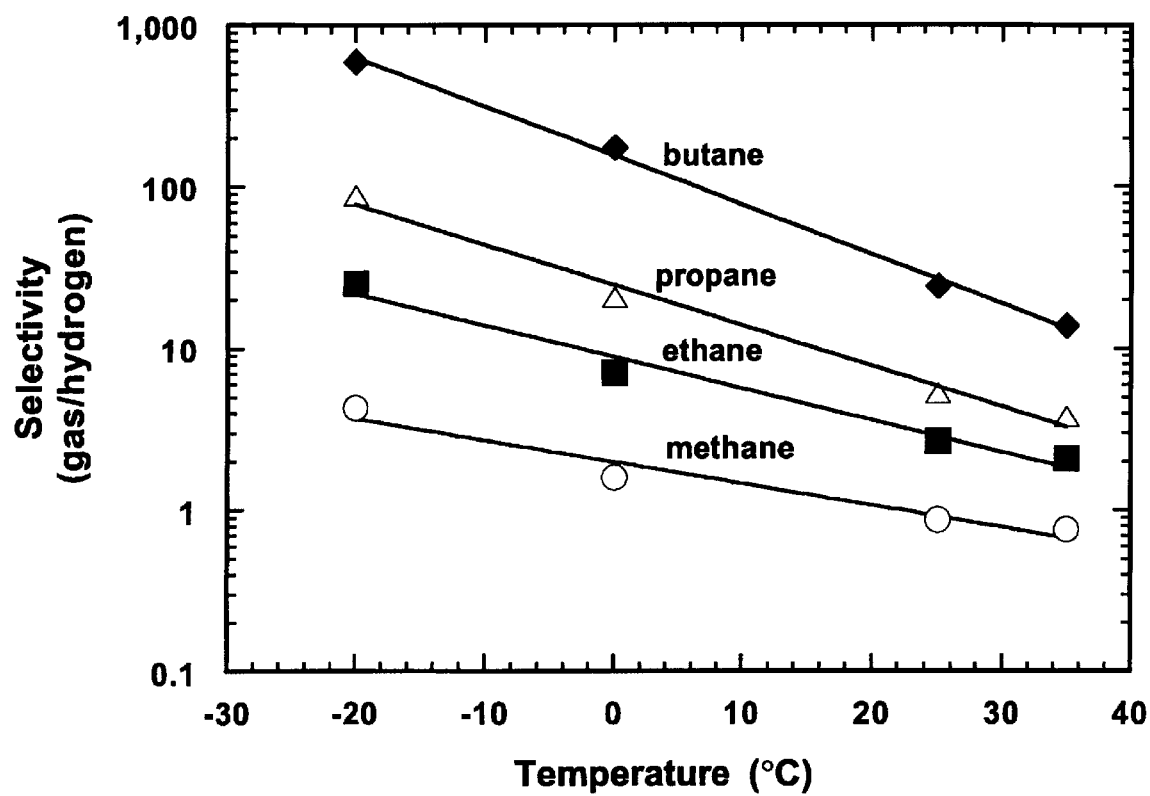
FIG. 7 is a graph showing the effect of temperature on the hydrocarbon/hydrogen selectivities of a silicone rubber film measured with a multicomponent gas mixture.

Permeability and selectivity results are shown in FIGS. 6 and 7, respectively, as a function of temperature. The permeabilities of both methane and hydrogen were higher at 35° C. in the multicomponent mixture than in the binary mixture. The permeability of hydrogen showed the same trend in the multicomponent mixture as in the binary mixture; that is, it decreased with decreasing temperature. The permeabilities of methane, ethane, propane and n-butane increased with decreasing feed temperature. For the most condensable gas, n-butane, the permeability increase was about 10-fold, from about 20,000 Barrer at 35° C. to about 200,000 Barrer at −20° C. The methane permeability almost doubled, from about 1,500 Barrer to about 3,000 Barrer, as the temperature was lowered from 35° C. to −20° C. This is an unexpected result, and the opposite from the trend in the binary mixture case, where decreasing the temperature also decreased the methane permeability.

As a result, the mixed-gas hydrocarbon/hydrogen selectivities increased significantly as the feed temperature decreased, as shown in FIG. 7. The methane/hydrogen selectivity increased from about 1.4 at 35° C. to about 5 at −20° C.

Example 5

A computer calculation was performed with a modeling program, ChemCad III (ChemStations, Inc., Houston, Tex.), to illustrate the process of the invention as reflected in the embodiment of FIG. 2.

The net gas from the phase separator/contactor section was assumed to be treated in PSA unit 202 operating at 400 psia, and the process was modeled only from the PSA treatment onward. After leaving the PSA unit, the tail gas, stream 204, was assumed to be combined with the first membrane permeate stream, 209, compressed to 400 psia and cooled to −10° C. by a combination of air cooling, heat exchange against the membrane feed stream, and external chilling. Membrane separation steps were assumed to be carried out using silicone rubber membranes in membrane units 208 and 211, both of which were assumed to be operating under conditions to yield a methane/hydrogen selectivity of 2.5. Membrane pressure-normalized fluxes in both membrane units were assumed to be as follows:

| | |
|---|---|
| Hydrogen | $100 \times 10^{-6}$ cm³(STP)/cm² · sec · cmHg |
| Methane | $250 \times 10^{-6}$ cm³(STP)/cm² · sec · cmHg |
| Ethane | $1,000 \times 10^{-6}$ cm³(STP)/cm² · sec · cmHg |
| Propane | $2,000 \times 10^{-6}$ cm³(STP)/cm² · sec · cmHg |
| n-Butane | $5,000 \times 10^{-6}$ cm³(STP)/cm² · sec · cmHg |
| n-Pentane | $8,000 \times 10^{-6}$ cm³(STP)/cm² · sec · cmHg |
| n-Hexane | $8,000 \times 10^{-6}$ cm³(STP)/cm² · sec · cmHg |

The contactor section off-gas stream was assumed to have the following composition:

| | |
|---|---|
| Hydrogen | 92.5% |
| Methane | 1.8% |
| Ethane | 2.2% |
| Propane | 1.9% |
| Butanes | 0.8% |
| Pentanes | 0.1% |
| n-Hexane | 0.7% |

The results of the calculations are shown in Table 1. The stream numbers correspond to FIG. 2.

TABLE 1

| Stream | 201 | 203 | 204 | 206 | 207 | 209 | 210 | 212 | 213 |
|---|---|---|---|---|---|---|---|---|---|
| Mass flow (lb/h) | 22,199 | 8,106 | 31,364 | 9,857 | 21,507 | 14,263 | 7,243 | 4,234 | 3,010 |
| Temp. (° C.) | 25 | 25 | −3 | −10 | −10 | −15 | −15 | −17 | −17 |
| Pressure (psia) | 400 | 400 | 50 | 400 | 400 | 50 | 400 | 50 | 400 |
| Component (mol %) | | | | | | | | | |
| Hydrogen | 92.5 | 100.0 | 59.0 | 1.5 | 64.9 | 36.4 | 81.0 | 65.4 | 89.4 |
| Methane | 1.8 | — | 11.9 | 2.6 | 12.8 | 14.3 | 12.0 | 17.6 | 8.9 |
| Ethane | 2.2 | 0.0 | 15.9 | 21.7 | 15.3 | 32.3 | 5.7 | 13.5 | 1.5 |
| Propane | 1.9 | 0.0 | 9.1 | 37.3 | 6.2 | 14.9 | 1.3 | 3.2 | 0.2 |
| n-Butane | 0.8 | 0.0 | 2.3 | 18.2 | 0.7 | 1.9 | 0.1 | 0.2 | 0.0 |
| n-Pentane | 0.1 | 0.0 | 0.2 | 2.3 | — | 0.1 | — | — | — |
| n-Hexane | 0.7 | 0.0 | 1.6 | 16.3 | — | — | — | — | — |
| Component (lb/h): | | | | | | | | | |
| Hydrogen | 8,659 | 8,081 | 2,530 | 6.2 | 2,524 | 509.5 | 2,014 | 570.9 | 1,443 |
| Methane | 1,335 | 24.8 | 4,048 | 81.6 | 3,966 | 1,594 | 2,372 | 1,227 | 1,145 |
| Ethane | 3,059 | 0 | 10,154 | 1,295 | 8,859 | 6,740 | 2,118 | 1,764 | 353.9 |
| Propane | 3,874 | 0 | 8,511 | 3,255 | 5,255 | 4,573 | 682.0 | 618.2 | 64.2 |
| n-Butane | 2,150 | 0 | 2,904 | 2,101 | 802.3 | 750.0 | 51.2 | 48.3 | 2.7 |
| n-Pentane | 333.6 | 0 | 363.6 | 332.1 | 31.5 | 30.0 | 1.5 | 1.5 | 0 |
| n-Hexane | 2,789 | 0 | 2,855 | 2,786 | 68.8 | 65.4 | 3.4 | 3.2 | 0 |

— = less than 0.1
Membrane area = 1,000 m$^2$
Actual horsepower = 2,056 hp

The process of the invention recovers nearly 9,900 lb/h of LPG as stream 206. In prior art processes using only PSA to treat the net gas from the contactor section, this product would have been lost in the tail gas from the PSA unit.

The process produces about 4,000 lb/h of purge gas, of which only 600 lb/h is hydrogen. In prior art processes which purge the entire PSA tail gas stream, the stream would contain 17,000 lb/h of gas, of which 2,000 lb/h is hydrogen. Thus, the process is very advantageous in debottlenecking plants where production is limited by fuel gas generation.

The process also provides a recycle stream of 3,000 lb/h (stream 213) containing over 1,400 lb/h of hydrogen to return to the PSA unit for additional recovery.

Example 6

A computer calculation was performed as in Example 5, but this time assuming that the gas to be treated is a mixed waste gas stream of the following composition:

| | |
|---|---|
| Hydrogen | 82.0% |
| Nitrogen | 1.0% |
| Methane | 10.3% |
| Ethane | 3.0% |
| Propane | 1.3% |
| n-Butane | 0.6% |
| n-Pentane | 1.8% |
| Carbon Dioxide | 0.1% |

The gas stream was assumed to have a flow rate of about 33,000 lb/h, and to be at a temperature of 25° C. and a pressure of 400 psia. The process design of FIG. 2 was assumed to be used. The results of the calculations are shown in Table 2. The stream numbers correspond to FIG. 2.

TABLE 2

| Stream | 201 | 203 | 204 | 206 | 207 | 209 | 210 | 212 | 213 |
|---|---|---|---|---|---|---|---|---|---|
| Mass flow (lb/h) | 32,879 | 6,722 | 61,603 | 13,166 | 48,437 | 33,873 | 14,563 | 12,981 | 1,583 |
| Temp. (° C.) | 25 | 25 | −11 | −10 | −10 | −20 | −20 | −25 | −25 |
| Pressure (psia) | 400 | 400 | 50 | 400 | 400 | 50 | 400 | 50 | 400 |
| Component (mol %) | | | | | | | | | |
| Hydrogen | 82.0 | 100.0 | 34.3 | 0.9 | 37.2 | 20.1 | 55.6 | 52.1 | 76.4 |
| Nitrogen | 1.0 | 0.0 | 3.0 | 0.2 | 3.2 | 1.0 | 5.6 | 3.8 | 16.6 |
| Methane | 10.3 | — | 32.0 | 6.9 | 34.2 | 35.0 | 33.3 | 37.8 | 6.9 |
| Ethane | 3.0 | 0.0 | 20.7 | 27.4 | 20.1 | 34.4 | 4.8 | 5.6 | — |
| Propane | 1.3 | 0.0 | 5.3 | 21.4 | 3.9 | 7.1 | 0.3 | 0.4 | 0.0 |
| n-Butane | 0.6 | 0.0 | 1.3 | 10.7 | 0.5 | 0.9 | — | — | 0.0 |
| n-Pentane | 1.8 | 0.0 | 2.9 | 32.2 | 0.4 | 0.7 | — | — | 0.0 |
| Carbon Dioxide | 0.1 | 0.0 | 0.5 | 0.3 | 0.5 | 0.7 | 0.3 | 0.3 | — |
| Component (lb/h): | | | | | | | | | |
| Hydrogen | 8,049 | 6,705 | 2,325 | 5.1 | 2,320 | 649.1 | 1,671 | 1,338 | 333.1 |
| Nitrogen | 1,364 | 0 | 2,806 | 14.6 | 2,792 | 433.9 | 2,358 | 1,350 | 1,008 |
| Methane | 8,046 | 16.6 | 17,263 | 298.8 | 16,964 | 8,992 | 7,972 | 7,731 | 240.8 |
| Ethane | 4,393 | 0 | 20,967 | 2,241 | 18,726 | 16,585 | 2,141 | 2,140 | 0.5 |
| Propane | 2,791 | 0 | 7,835 | 2,569 | 5,266 | 5,043 | 223.0 | 223.0 | — |
| n-Butane | 1,698 | 0 | 2,539 | 1,687 | 851.6 | 840.9 | 10.7 | 10.7 | 0 |

TABLE 2-continued

| | | | | | | | | | |
|---|---|---|---|---|---|---|---|---|---|
| n-Pentane | 6,324 | 0 | 7,144 | 6,317 | 827.1 | 820.6 | 6.5 | 6.5 | 0 |
| Carbon Dioxide | 214.3 | 0 | 723.1 | 33.3 | 689.8 | 508.2 | 181.6 | 181.0 | 0.6 |

— = less than 0.1
Membrane area = 2,500 m$^2$
Actual horsepower = 3,155 hp

The process of the invention recovers 13,000 lb/h of LPG as stream 206, and recycles a stream of 1,600 lb/h (stream 213) containing over 300 lb/h of hydrogen to the PSA unit for further hydrogen recovery. The process produces 13,000 lb/h of purge gas, of which only 1,300 lb/h is hydrogen. In prior art processes which purge the entire PSA tail gas stream, the stream would contain nearly 28,000 lb/h of gas, of which 1,700 lb/h is hydrogen.

Example 7

A computer calculation was performed with a modeling program, ChemCad III (ChemStations, Inc., Houston, Tex.), to illustrate the process of the invention as reflected in the embodiment of FIG. 1, again for treating the overhead gas from the recontactor section of a catalytic reformer.

The net gas from the phase separator/contactor section was assumed to be a leaner gas than the cases of Examples 5 and 6. Stream 101, after being combined with membrane residue recycle stream 110 (recycle not shown in FIG. 1), is assumed to be treated in PSA unit 102 operating at 400 psia, and the process was modeled only from the PSA treatment onward. After leaving the PSA unit, the tail gas, stream 104, was assumed to be recompressed to 400 psia and cooled to −10° C. by a combination of air cooling, heat exchange against the membrane feed stream, and external chilling. The membrane separation step was assumed to be carried out using a silicone rubber membrane in membrane unit 108. Membrane pressure-normalized fluxes were assumed to be as in Example 1. The contactor section off-gas stream was assumed to have the following composition:

| | |
|---|---|
| Hydrogen | 90.0% |
| Methane | 5.0% |
| Ethane | 3.0% |
| Propane | 1.0% |
| n-Butane | 0.5% |
| n-Pentane | 0.5% |

The results of the calculations are shown in Table 3. The stream numbers correspond to FIG. 1.

TABLE 3

| Stream | 101 | 103 | 104 | 106 | 107 | 109 | 110 |
|---|---|---|---|---|---|---|---|
| Mass flow (lb/h) | 21,404 | 7,387 | 15,424 | 2,567 | 12,856 | 11,450 | 1,406 |
| Temp. (° C.) | 25 | 25 | 20 | −10 | −10 | −15 | −15 |
| Pressure (psia) | 400 | 400 | 50 | 400 | 400 | 50 | 400 |
| Component (mol %) | | | | | | | |
| Hydrogen | 90.0 | 99.9 | 64.5 | 1.4 | 66.7 | 56.3 | 90.5 |
| Methane | 5.0 | 0.1 | 19.0 | 3.8 | 19.5 | 24.0 | 9.2 |
| Ethane | 3.0 | 0.0 | 9.9 | 14.1 | 9.8 | 14.0 | 0.3 |
| Propane | 1.0 | 0.0 | 3.3 | 17.5 | 2.8 | 4.0 | — |
| n-Butane | 0.5 | 0.0 | 1.6 | 23.9 | 0.8 | 1.3 | — |
| n-Pentane | 0.5 | 0.0 | 1.6 | 39.3 | 0.4 | 0.5 | — |
| Component (lb/h): | | | | | | | |
| Hydrogen | 8,422 | 7,344 | 1,836 | 1.3 | 1,835 | 1,077 | 757.7 |
| Methane | 3,724 | 43.4 | 4,294 | 28.2 | 4,266 | 3,653 | 613.3 |
| Ethane | 4,188 | 0 | 4,220 | 197.9 | 4,022 | 3,990 | 32.2 |
| Propane | 2,047 | 0 | 2,050 | 361.6 | 1,688 | 1,685 | 2.7 |
| n-Butane | 1,349 | 0 | 1,349 | 650.4 | 698.9 | 698.7 | 0.2 |
| n-Pentane | 1,675 | 0 | 1,675 | 1,328 | 346.7 | 346.7 | — |

— = less than 0.1
Membrane area = 1,000 m$^2$
Actual horsepower = 1,534 hp

The process of the invention recovers nearly 2,600 lb/h of LPG as stream 106. In prior art processes using only PSA to treat the net gas from the contactor section, this product would have been lost in the tail gas from the PSA unit.

The process produces 11,000 lb/h of purge gas, of which about 1,100 lb/h is hydrogen. In prior art processes which purge the entire PSA tail gas stream, the stream would contain 15,000 lb/h of gas, of which 1,800 lb/h is hydrogen. Thus, the process is very advantageous in debottlenecking plants where production is limited by fuel gas generation.

We claim:

1. A process for separating a stream comprising hydrogen, methane and a C$_{3+}$ hydrocarbon into at least three streams of different composition, comprising the following steps:
   (a) passing the stream through a pressure swing adsorption unit, thereby producing a hydrogen-enriched product stream and a tail gas stream;
   (b) compressing and cooling the tail gas stream, thereby producing a condensed C$_{3+}$ hydrocarbon stream and an uncondensed stream;

(c) passing the uncondensed stream across the feed side of a membrane separation unit containing a rubbery polymeric membrane, having a feed side and a permeate side and being selectively permeable to methane over hydrogen, under conditions sufficient that the membrane exhibits a methane/hydrogen selectivity of at least about 2.5;

(d) withdrawing from the permeate side a permeate stream enriched in methane and $C_{3+}$ hydrocarbon compared with the uncondensed stream;

(e) withdrawing from the feed side a residue stream enriched in hydrogen compared with the uncondensed stream.

2. The process of claim 1, further comprising recirculating at least a portion of the residue stream to step (a).

3. The process of claim 1, further comprising subjecting at least a portion of the residue stream to additional treatment.

4. The process of claim 1, further comprising subjecting at least a portion of the permeate stream to additional treatment.

5. The process of claim 1, further comprising recirculating at least a portion of the permeate stream to step (b).

6. The process of claim 1, wherein the polymeric membrane comprises silicone rubber.

7. The process of claim 1, wherein the polymeric membrane comprises a polysiloxane.

8. The process of claim 1, wherein the selectivity exhibited in step (c) is at least about 3.

9. The process of claim 1, wherein the selectivity exhibited in step (c) is at least about 4.

10. The process of claim 1, wherein the stream comprises an effluent stream from an operation chosen from the group consisting of catalytic reforming, steam reforming, hydrocracking, hydrotreating, hydrogenation, dehydrogenation, hydrodealkylation and isomerization.

11. The process of claim 1, wherein the stream comprises an effluent stream from a catalytic reformer.

12. A process for separating a stream comprising hydrogen, methane and a $C_{3+}$ hydrocarbon into at least three streams of different composition, comprising the following steps:

(a) passing the stream through a pressure swing adsorption unit, thereby producing a hydrogen-enriched product stream and a tail gas stream;

(b) compressing and cooling the tail gas stream, thereby producing a condensed $C_{3+}$ hydrocarbon stream and an uncondensed stream;

(c) passing the uncondensed stream across the first feed side of a first polymeric membrane having a first feed side and a first permeate side, and being selectively permeable to $C_{2+}$ hydrocarbons over hydrogen;

(d) withdrawing from the first permeate side a first permeate stream enriched in $C_{3+}$ hydrocarbons compared with the uncondensed stream;

(e) withdrawing from the first feed side a first residue stream enriched in hydrogen compared with the uncondensed stream;

(f) passing the first residue stream across the second feed side of a second rubbery polymeric membrane having a second feed side and a second permeate side and being selectively permeable to methane over hydrogen, under conditions sufficient that the membrane exhibits a methane/hydrogen selectivity of at least about 2.5;

(g) withdrawing from the second permeate side a second permeate stream enriched in methane and $C_{3+}$ hydrocarbon compared with the first residue stream;

(h) withdrawing from the second feed side a second residue stream enriched in hydrogen compared with the first residue stream.

13. The process of claim 12, wherein the second residue stream is recirculated to step (a).

14. The process of claim 12, wherein the first permeate stream is recirculated to step (b).

15. The process of claim 12, wherein the second residue stream is recirculated to step (a), the first permeate stream is recirculated to step (b), and the second permeate stream is used as fuel gas.

* * * * *